United States Patent
Kang et al.

(10) Patent No.: US 10,809,087 B2
(45) Date of Patent: Oct. 20, 2020

(54) APPARATUS AND METHOD FOR DRIVING VEHICLE ALONG NORMAL ROUTE

(71) Applicant: MANDO CORPORATION, Gyeonggi-do (KR)

(72) Inventors: Yong Gyu Kang, Gyeonggi-do (KR); Jun Hee Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 208 days.

(21) Appl. No.: 15/832,791

(22) Filed: Dec. 6, 2017

(65) Prior Publication Data

US 2018/0156626 A1 Jun. 7, 2018

(30) Foreign Application Priority Data

Dec. 7, 2016 (KR) .................. 10-2016-0165836

(51) Int. Cl.
*G01C 21/36* (2006.01)
*G06K 9/46* (2006.01)
(Continued)

(52) U.S. Cl.
CPC ..... *G01C 21/3602* (2013.01); *G01C 21/3658* (2013.01); *G06K 9/00798* (2013.01);
(Continued)

(58) Field of Classification Search
CPC .... G06K 9/00798; G06K 9/4652; G06K 9/00; G06K 9/46; G08G 1/0969; G08G 1/167;
(Continued)

(56) References Cited

U.S. PATENT DOCUMENTS

| | | | |
|---|---|---|---|
| 7,613,326 B2 * | 11/2009 | Unwin ...................... | G01J 3/50 348/118 |
| 8,611,650 B2 * | 12/2013 | Klein ...................... | G06T 7/136 382/162 |
| 2008/0208460 A1 * | 8/2008 | Nakao ................ | G01C 21/3602 701/532 |

FOREIGN PATENT DOCUMENTS

CN 102880177 1/2013
CN 103162693 6/2013
(Continued)

OTHER PUBLICATIONS

Office Action dated Jul. 18, 2018 for Korean Patent Application No. 10-2016-0165836 and its English machine translation by Global Dossier.
(Continued)

*Primary Examiner* — Anthony R. Jimenez
(74) *Attorney, Agent, or Firm* — Ladas & Parry, LLP

(57) ABSTRACT

An apparatus and method for driving a vehicle along a normal route detect a vehicle guidance line marked on a surface of a lane in which the vehicle is driving and determine whether the lane is identical to a lane of a driving route of the vehicle. The apparatus for driving a vehicle along a normal route includes a driving route generation unit for generating a first driving route of the vehicle, an image generation unit for generating a front-side view image of the vehicle, a guidance line detection unit for detecting a vehicle guidance line marked on a road surface based on the front-side view image, and a controller for controlling the vehicle so as to drive along a normal route by comparing the first driving route of the vehicle with a second driving route based on a color of the vehicle guidance line.

14 Claims, 4 Drawing Sheets

(51) Int. Cl.
  *G06K 9/00* (2006.01)
  *G08G 1/0969* (2006.01)
  *G08G 1/16* (2006.01)

(52) U.S. Cl.
  CPC ......... *G06K 9/4652* (2013.01); *G08G 1/0969* (2013.01); *G08G 1/167* (2013.01)

(58) Field of Classification Search
  CPC .. G08G 1/16; G01C 21/3602; G01C 21/3658; G01C 21/36
  USPC ........................................................ 701/433
  See application file for complete search history.

(56) References Cited

FOREIGN PATENT DOCUMENTS

| | | |
|---|---|---|
| CN | 103827635 | 5/2014 |
| CN | 104085396 | 10/2014 |
| CN | 104101353 | 10/2014 |
| CN | 105922991 | 9/2016 |
| CN | 105966398 | 9/2016 |
| JP | 2010-203934 | 9/2010 |
| JP | 2013-25394 | 2/2013 |
| JP | 2014-71001 | 4/2014 |
| JP | 2017-62706 | 3/2017 |
| KR | 10-2012-0070886 | 7/2012 |
| KR | 10-2012-0078876 | 7/2012 |
| KR | 10-2013-0010718 | 1/2013 |
| KR | 10-2016-0056181 | 5/2016 |

OTHER PUBLICATIONS

Office Action dated May 22, 2020 for Chinese Patent Application No. 201711271140.2 and its English machine translation by Google Translate.

* cited by examiner

[FIG. 1]
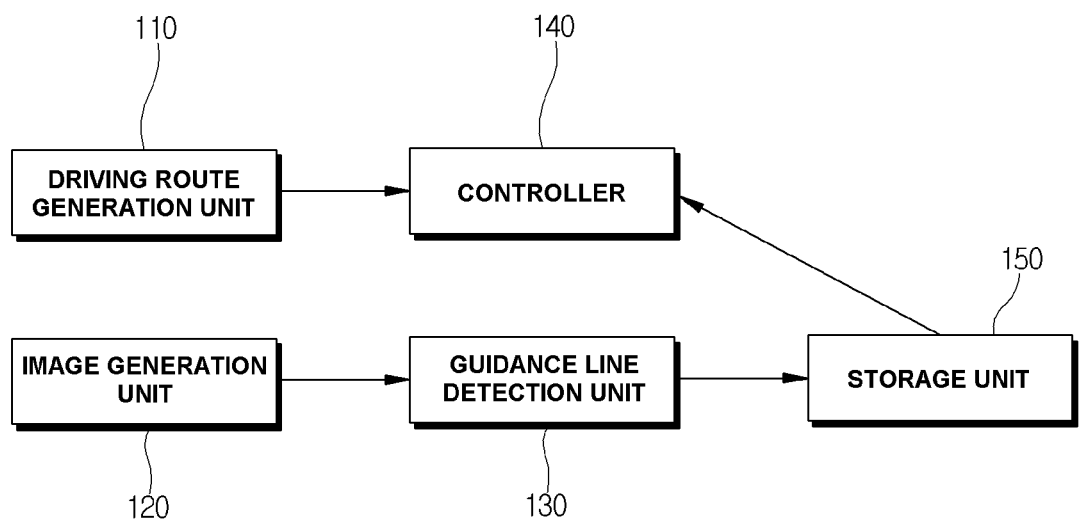
[FIG. 2]
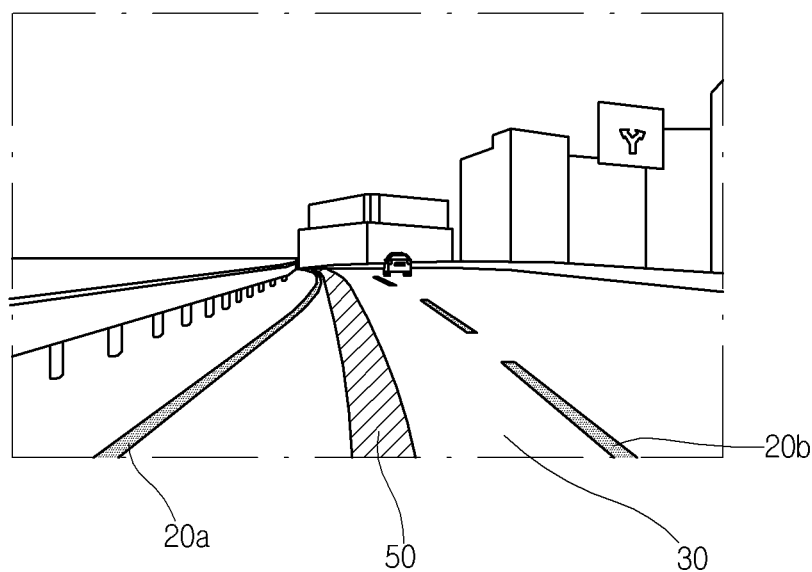

[FIG. 3]
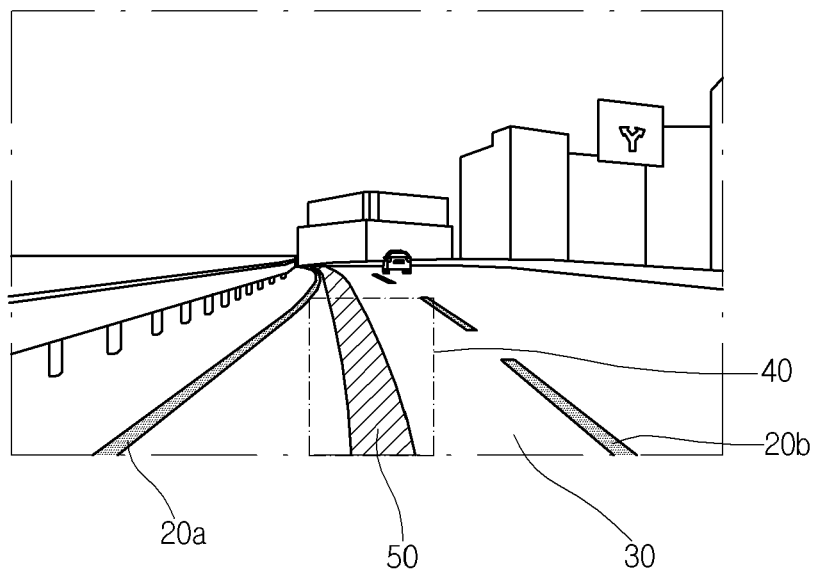
[FIG. 4]
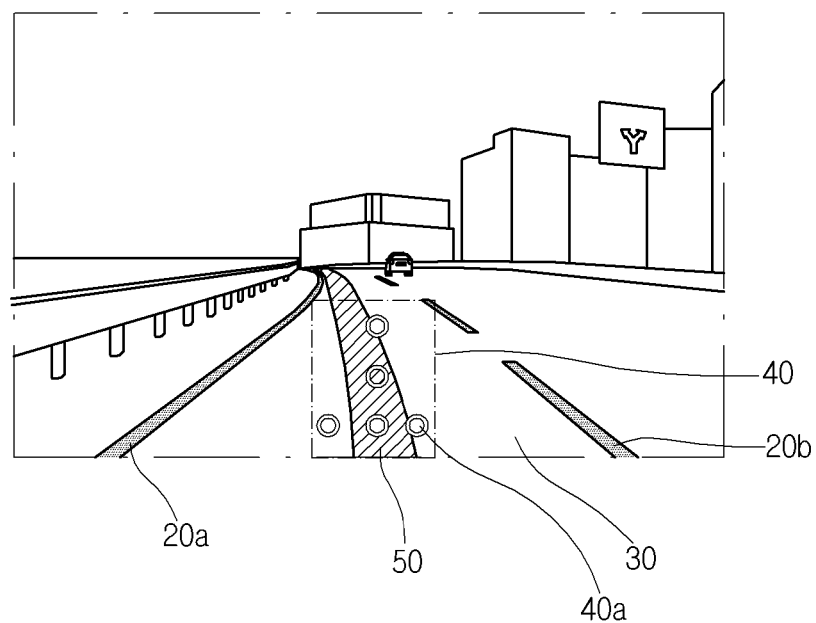

[FIG. 5]
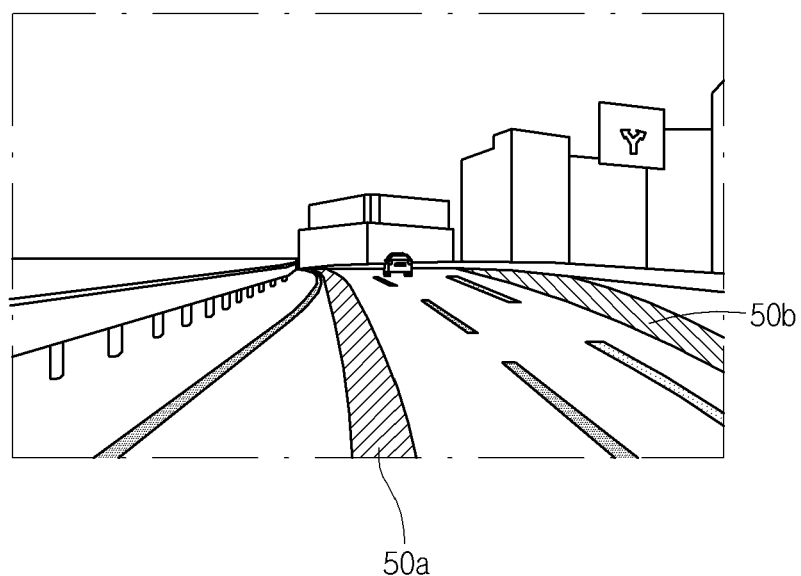

[FIG. 6]
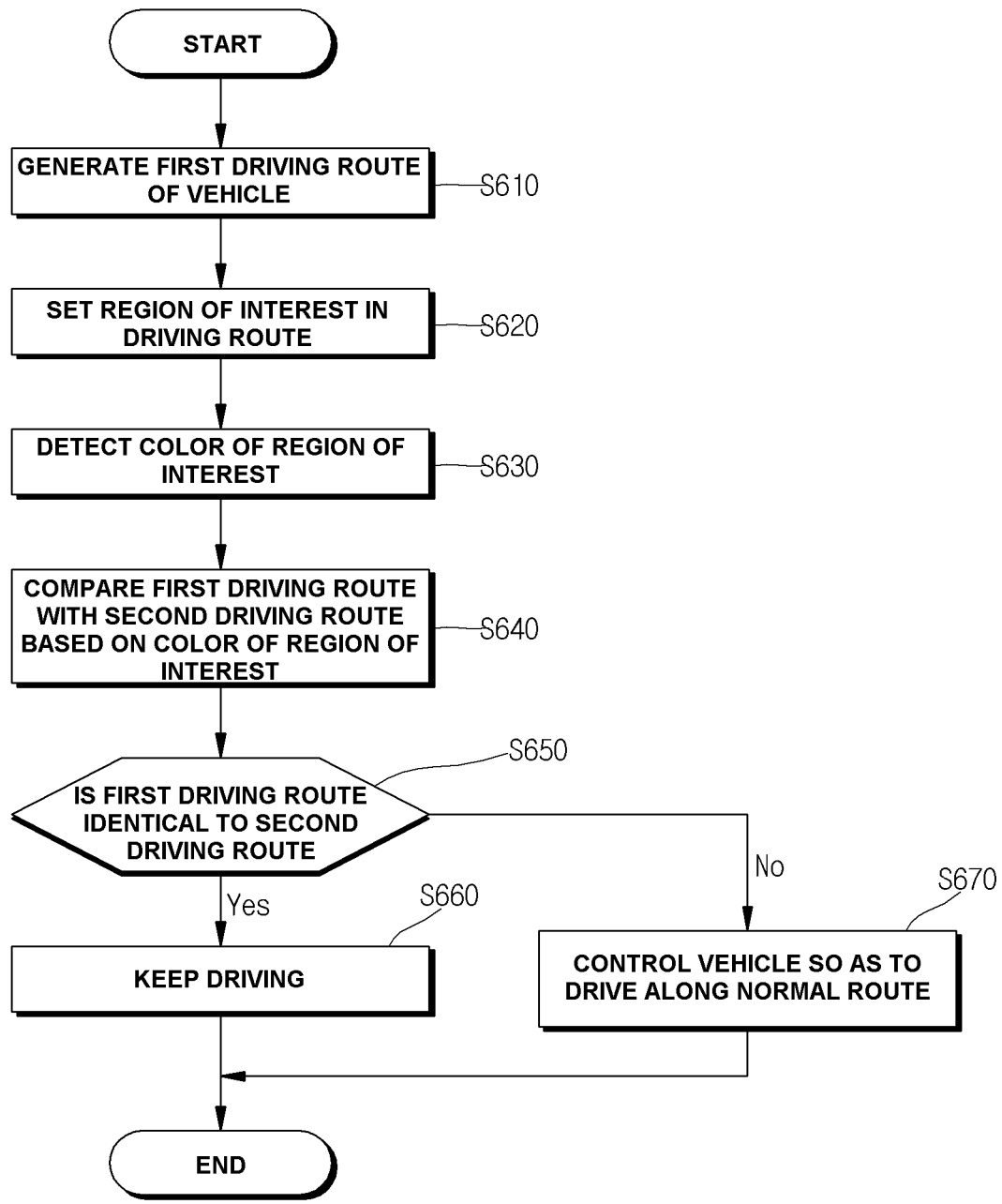

APPARATUS AND METHOD FOR DRIVING VEHICLE ALONG NORMAL ROUTE

CROSS-REFERENCE TO RELATED APPLICATION

This application claims priority to Korean Patent Application No. 10-2016-0165836, filed on Dec. 7, 2016, the disclosure of which is incorporated herein by reference in its entirety.

BACKGROUND OF THE INVENTION

Field of the Invention

Exemplary embodiments of the present disclosure relate to an apparatus and method for driving a vehicle along a normal route, and more particularly, to an apparatus and method for driving a vehicle along a normal route by detecting a vehicle guidance line marked on the surface of a lane in which the vehicle is driving and determining whether the lane matches the driving route of the vehicle.

Description of the Related Art

Generally, a navigation system is a driving information system or a driving guidance system for guiding a vehicle to a destination by providing position information to the vehicle that is driving. The navigation system displays the current position, geographic information of the route to a destination, the shortest distance to the destination, and a direction in which the vehicle is driving on a monitor based on road information that a Global Positioning System (GPS) receives from a satellite.

Generally, drivers who use a navigation system occasionally deviate from a route because it is difficult to find which way to go at the fork, the entrance ramp, and the exit ramp depending only on the content displayed on the screen of the navigation system. For example, a driver occasionally takes the wrong road, other than the road that the driver must take, at the fork or at the entrance and the exit ramps. However, in this case, there is a problem that due to the error of the GPS, the deviation from the route may not be recognized until the error falls out of an error tolerance range.

DOCUMENTS OF THE RELATED ART (Patent Document 1) Korean Patent Application Publication No. 10-2013-0010718 (publication date: 2013 Jan. 29).

SUMMARY OF THE INVENTION

The present disclosure intends to solve the above-mentioned problem, and an object of the present disclosure is to provide an apparatus and method for driving a vehicle along a normal route by detecting the color of a vehicle guidance line marked on a road surface and determining whether a lane in which the vehicle is driving is identical to a lane of the driving route of the vehicle when the vehicle approaches a highway entrance ramp or exit ramp.

Another object of the present disclosure is to provide an apparatus and method for driving a vehicle along a normal route by determining whether a lane in which the vehicle is driving is identical to a lane of the driving route of the vehicle and controlling the vehicle so as to drive along a normal route.

In addition to the technical problems of the present disclosure mentioned above, other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided an apparatus for driving a vehicle along a normal route. The apparatus for driving a vehicle along a normal route may include a driving route generating unit for generating a first driving route of the vehicle, an image generation unit for generating a front-side view image of the vehicle, a guidance line detecting unit for detecting a vehicle guidance line marked on a road surface based on the front-side view image, and a controller for controlling the vehicle so as to drive along a normal route by comparing the first driving route of the vehicle with a second driving route generated by detecting the vehicle guidance line.

According to an embodiment, the guidance line detection unit may recognize lane marking marked on the road surface based on the front-side view image, and may identify a lane in which the vehicle is driving based on the lane markings.

According to an embodiment, the guidance line detection unit may set a center of the lane in which the vehicle is driving as a region of interest.

According to an embodiment, the guidance line detection unit may set a certain area in front of the vehicle as a region of interest, detect colors within the region of interest, and recognize a color occupying a great part thereof, excluding a color of a road among the colors within the region, as a color of the vehicle guidance line.

According to an embodiment, the guidance line detection unit may set multiple sampling areas for detecting colors within the region of interest, and may recognize a color of a majority of sampling areas, among the colors detected in the sampling areas, as the color of the vehicle guidance line.

According to an embodiment, the driving route generation unit may send information about a color of a predetermined vehicle guidance line corresponding to the first driving route to the controller, and the controller may determine whether the first driving route is identical to the second driving route depending on whether a color of the vehicle guidance line, detected by the guidance line detection unit, is identical to the information about the color of the predetermined vehicle guidance line.

According to an embodiment, the second driving route may be a route following a vehicle guidance line having a color that is identical to a color of the vehicle guidance line detected by the guidance line detection unit.

According to an embodiment, the controller may control the vehicle so as to keep driving when it is determined that the first driving route is identical to the second driving route as a result of determination of whether the first driving route is identical to the second driving route.

According to an embodiment, the controller may control the vehicle so as to drive along a normal route that is identical to the first driving route when it is determined that the first driving route is not identical to the second driving route as a result of determination of whether the first driving route is identical to the second driving route.

According to an embodiment, the controller may display a warning message to a driver of the vehicle when it is determined that the first driving route is not identical to the second driving route as a result of determination of whether the first driving route is identical to the second driving route.

In accordance with another aspect of the present disclosure, there is provided a method for driving a vehicle along a normal route. The method for driving a vehicle along a normal route may include generating a first driving route of the vehicle, detecting a vehicle guidance line using a front-side view image of the vehicle, generating a second driving route based on a result of detecting the vehicle guidance line, and controlling the vehicle so as to drive along a normal route by comparing the first driving route with the second driving route.

According to an embodiment, in the detecting of the vehicle guidance line, the first driving route of the vehicle may be generated, lane markings marked on a road surface may be recognized based on the front-side view image acquired by capturing an image of a front of the vehicle, and a lane in which the vehicle is driving may be identified based on the lane markings.

According to an embodiment, in the detecting of the vehicle guidance line, a certain area in front of the vehicle may be set as a region of interest, a color of the region of interest may be detected, and a color occupying a great part of the region of interest, excluding a color of road, may be recognized as a color of the vehicle guidance line.

According to an embodiment, in the controlling of the vehicle, whether the first driving route is identical to the second driving route may be determined depending on whether information about a color of a predetermined vehicle guidance line corresponding to the first driving route is identical to a color of the vehicle guidance line in front of the vehicle.

According to an embodiment, in the controlling of the vehicle, the vehicle may be controlled so as to keep driving when it is determined that the second driving route is identical to the first driving route.

According to an embodiment, in the controlling of the vehicle, the vehicle may be controlled so as to drive along a normal route that is identical to the first driving route when it is determined that the second driving route based on the color of the vehicle guidance line is not identical to the first driving route.

According to an embodiment, in the controlling of the vehicle, a warning message may be displayed to a driver of the vehicle when it is determined that the second driving route based on the color of the vehicle guidance line is not identical to the first driving route.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view that shows the configuration of an apparatus for driving a vehicle along a normal route according to an embodiment of the present disclosure;

FIG. 2 is a view that shows the detection of a lane in which a vehicle drives;

FIG. 3 is a view that shows setting of a region of interest;

FIG. 4 is a view that shows detection of the color of a vehicle guidance line in the region of interest;

FIG. 5 is a view that shows a driving route based on the color of a vehicle guidance line; and FIG. 6 is a flowchart that shows a method for driving a vehicle along a normal route according to an embodiment of the present disclosure.

DESCRIPTION OF SPECIFIC EMBODIMENTS

Hereinafter, a preferred embodiment of the present disclosure is described in detail with reference to the accompanying drawings so that those having ordinary knowledge in the technical field to which the present disclosure pertains can easily practice the present disclosure. The present disclosure may be implemented in different forms, and is not limited to an embodiment to be described herein.

In order to clearly describe the present disclosure, a part that is not related to the description will be omitted, and the same reference numerals are used to designate the same or similar elements throughout this specification.

It will be understood that when an element is referred to as being "connected" or "coupled" to another element, it can be directly connected or coupled to the other element, or it can be "electrically connected" to the other element with an intervening elements therebetween. It will be further understood that the term "comprising", when used herein, does not preclude the presence or addition of other elements, but an additional element may also be included in the embodiments or the scope of the technical idea of the embodiments.

It will be understood that when an element is referred to as being "on" another element, it can be directly on another element or intervening elements may be present therebetween. In contrast, when an element is referred to as being "directly on" another element, there are no intervening elements therebetween.

It will be understood that, although the terms first, second, third, etc. may be used herein to describe various elements, components, regions, layers and/or sections, but are not limited thereto. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure.

The technical terms used herein are to simply mention a particular exemplary embodiment and are not meant to limit the present disclosure. An expression used in the singular encompasses the expression of the plural, unless it has a clearly different meaning in the context. In the specification, it is to be understood that the terms such as "including" or "having" etc., are intended to indicate the existence of specific features, regions, numbers, stages, operations, elements, components, or combinations thereof disclosed in the specification, and are not intended to preclude the possibility that one or more other specific features, regions, numbers, stages, operations, elements, components, or combinations thereof may exist or may be added.

Spatially relative terms, such as "below", "above", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the drawings. For example, if the device in the figures is turned over, elements described as "below" other elements or features would then be oriented "above" the other elements or features. Thus, the exemplary term "below" can encompass both an orientation of above and below. Devices may be otherwise rotated 90 degrees or at other angles and the spatially relative descriptors used herein interpreted accordingly.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Hereinafter, a preferred embodiment of the present disclosure is described in detail with reference to the accompanying drawings so that those having ordinary knowledge in the technical field to which the present disclosure pertains can easily practice the present disclosure. However, the present disclosure may be implemented in different forms, and is not limited to an embodiment described herein.

FIG. 1 is a view that shows the configuration of an apparatus for driving a vehicle along a normal route according to an embodiment of the present disclosure.

Referring to FIG. 1, the apparatus 100 for driving a vehicle along a normal route according to an embodiment of the present disclosure may include a driving route generation unit 110, an image generation unit 120, a guidance line detection unit 130, a controller 140, and a storage unit 150.

The driving route generation unit 110 generates a first driving route of a vehicle. Specifically, the driving route generation unit 110 may include a navigation system installed in the vehicle, and may generate the first driving route to a destination based on road information that a Global Positioning System (GPS) received from a satellite. For example, the road information may include information about the color of a vehicle guidance line formed on the first driving route along which the vehicle drives, information about the color of the road in the first driving route, and the like.

Also, the driving route generation unit 110 may generate information about the current position, the shortest distance to the destination, geographic information of the route to a destination, and the like based on the road information in addition to the first driving route. The driving route generation unit 110 may provide the first driving route and the road information to the controller 140.

The image generation unit 120 may generate a front-side view image of the vehicle. Specifically, the image generation unit 120 generates the front-side view image of the vehicle using a camera installed in the vehicle. Here, the front-side view image may include information such as lane markings, a speed limit, a driving direction, a vehicle guidance line, and the like marked on the road. Here, the image generation unit 120 may generate a rear-side view image or a left or right side view image of the vehicle without limitation to the front-side view image. The image generation unit 120 may provide the front-side view image to the guidance line detection unit 130.

The guidance line detection unit 130 detects a vehicle guidance line marked on a road surface based on the front-side view image provided from the image generation unit 120. Specifically, the guidance line detection unit 130 may detect lane markings and a vehicle guidance line marked on the road surface based on the front-side view image. Also, the guidance line detection unit 130 identifies respective lanes based on the detected lane markings, and may recognize the lane in which the vehicle is driving and the vehicle guidance line in the corresponding lane.

FIG. 2 is a view that shows the detection of a lane in which the vehicle is driving.

Referring to FIG. 1 and FIG. 2, the image generation unit 120 generates a front-side view image of the vehicle using a camera installed in the vehicle. The guidance line detection unit 130 identifies lane markings 20 based on the front-side view image generated by the image generation unit 120. The guidance line detection unit 130 may recognize the space between the first lane marking 20a and the second lane marking 20b, which are closest to the vehicle among the identified lane markings 20a and 20b, as the lane 30 in which the vehicle is driving. Here, a vehicle guidance line 50 may be marked on the lane 30 in which the vehicle is driving.

Subsequently, the guidance line detection unit 130 sets a region of interest 40 in the lane 30 in which the vehicle is driving based on the front-side view image. Specifically, the guidance line detection unit 130 may set the entire or partial area of the lane 30 in front of the vehicle as the region of interest 40. When it sets a partial area of the lane 30 as the region of interest 40, the guidance line detection unit 130 may set the center of the lane 30 as the region of interest 40. Here, because the width of the lane 30 is narrower in the upper part of the front-side view image than in the lower part thereof, the width of the region of interest 40 may be set narrower in the upper part of the front-side view image than in the lower part thereof.

FIG. 3 is a view that shows setting of a region of interest.

Referring to FIG. 1 and FIG. 3, the guidance line detection unit 130 detects lane markings 20a and 20b marked on the road surface based on the front-side view image provided from the image generation unit 120. The lane 30 in which the vehicle is driving is the space between the first lane marking 20a and the second lane marking 20b that are closest to the vehicle, and the guidance line detection unit 130 may set the region of interest 40 within the lane 30.

Subsequently, the guidance line detection unit 130 may set a part of the region of interest 40 as multiple sampling areas 40a. That is, the guidance line detection unit 130 may set multiple sampling areas 40a in order to detect multiple colors in the region of interest 40. The range of a single sampling area 40a may be smaller than the range of the region of interest 40. Here, the storage unit 150 stores a color table for identifying colors painted on the road surface, and the guidance line detection unit 130 may detect the colors of the sampling areas 40a based on the color table stored in the storage unit 150.

Subsequently, the guidance line detection unit 130 may recognize the most frequently detected color as the color of the vehicle guidance line 50. In other words, the guidance line detection unit 130 may recognize the color occupying a great part, among the colors within the region of interest 40, as the color of the vehicle guidance line 50. The guidance line detection unit 130 may detect multiple colors within the respective sampling areas 40a. Here, the guidance line detection unit 130 detects the color of a majority of sampling areas 40a, excluding the color of the road surface, whereby the error in which the road is erroneously recognized as a general road without the vehicle guidance line 50 may be avoided. For example, the color of the road surface may be black. The guidance line detection unit 130 provides information about the color of the vehicle guidance line 50 to the controller 140.

FIG. 4 is a view that shows detection of the color of a vehicle guidance line in the region of interest.

Referring to FIG. 1 and FIG. 4 the guidance line detection unit 130 may set the entire or a partial area of the lane 30 as the region of interest 40. Also, the guidance line detection unit 130 sets a part of the region of interest 40 as a sampling area 40a, and detects the colors of multiple sampling areas 40a. Here, with an increase in the number of sampling areas 40a, the accuracy of detection of the color of the vehicle guidance line 50 within the region of interest 40 may be improved.

Subsequently, the controller 140 may determine whether the first driving route provided from the driving route generation unit 110 is identical to the second driving route based on the color of the vehicle guidance line 50. Specifically, the controller 140 may determine whether information about the color of the predetermined vehicle guidance line corresponding to the first driving route is identical to the color of the vehicle guidance line 50 in front of the vehicle, which is detected by the guidance line detection unit 130. The information about the color of the predetermined vehicle guidance line may be a part of the road information received from the driving route generation unit 110. For example, the navigation system may send the controller 140 information about the color of the vehicle guidance line in the first driving route of the vehicle. The controller 140 may determine whether the first driving route is identical to the second driving route depending on whether the color of the predetermined vehicle guidance line is identical to the color of the vehicle guidance line 50 detected by the guidance line detection unit 130. According to an embodiment of the present disclosure, in order to determine whether the first driving route is identical to the second driving route, the controller 140 may compare information about the predetermined vehicle guidance line with the color of the vehicle guidance line acquired from the front-side view image of the vehicle. Accordingly, the apparatus 100 for driving a vehicle along a normal route may quickly recognize the error in the first driving route.

Subsequently, the controller 140 may control the vehicle so as to drive along the normal route by comparing the first driving route with the second driving route. Specifically, when it is determined that the first driving route is identical to the second driving route as the result of comparison of the first driving route and the second driving route, the controller 140 may control the vehicle so as to keep driving.

Meanwhile, when it is determined as the result of comparison of the first driving route and the second driving route that the first driving route is not identical to the second driving route, the controller 140 may control the vehicle so as to drive along the normal route. Here, the normal route is the first driving route, and the controller 140 may determine whether the vehicle is driving along the normal route using the color of the vehicle guidance line 50. Also, when it is determined that the first driving route is not identical to the second driving route, the controller 140 may display a warning message to the driver of the vehicle. The warning message may announce that it is necessary to differently control the vehicle because the first driving route is not identical to the second driving route. For example, the warning message may be delivered to the driver using voice or a display.

FIG. 5 is a view that shows a driving route based on the color of the vehicle guidance line.

Referring to FIGS. 1 to 5, the guidance line detection unit 130 detects the color of the first vehicle guidance line 50a on the lane 30 in which the vehicle is driving. Here, the controller 140 compares the second driving route based on the color of the vehicle guidance line 50 stored in the storage unit 150 with the first driving route. Here, the second vehicle guidance line 50b, having the different color from the first vehicle guidance line 50a, may be marked on the different lane.

When it is determined that the first driving route is identical to the second driving route as the result of comparison of the first driving route and the second driving route, the controller 140 controls the vehicle so as to keep driving along the first vehicle guidance line 50a.

Meanwhile, when it is determined that the first driving route is not identical to the second driving route as the result of comparison of the first driving route and the second driving route, the controller 140 may control the vehicle so as to drive along the normal route that is the first driving route. Here, the lane on which the second vehicle guidance line 50b having the different color from the first vehicle guidance line 50a may be the lane of the normal route. Accordingly, the controller 140 may control the vehicle so as to drive in the lane on which the second vehicle guidance line 50b is marked.

FIG. 6 is a flowchart that shows a method for driving a vehicle along a normal route according to an embodiment of the present disclosure.

Referring to FIGS. 1 to 6, the driving route generation unit 110 generates a first driving route of a vehicle at step S610. Specifically, the driving route generation unit 110 may generate a first driving route to a destination based on road information that a Global Positioning System (GPS) received from a satellite.

Then, the guidance line detection unit 130 sets a region of interest in a lane at step S620. Specifically, the guidance line detection unit 130 sets the entire or a part of the lane 30 in which the vehicle is driving as the region of interest 40 based on a front-side view image.

Then, the guidance line detection unit 130 detects the color of the region of interest 40 at step S630. Specifically, the guidance line detection unit 130 sets a certain area of the region of interest 40 as a sampling area 40a, and detects the respective colors of multiple sampling areas 40a. Here, the storage unit 150 has stored a color table for identifying colors painted on the road surface, and the guidance line detection unit 130 may detect the colors of the sampling areas 40a based on the color table stored in the storage unit 150. Here, the guidance line detection unit 130 may recognize the most frequently detected color, excluding the color of the road among the detected colors, as the color of the vehicle guidance line 50.

Then, the controller 140 compares the second driving route based on the color of the region of interest 40 with the first driving route at step S640. The controller 140 may determine whether the vehicle is driving along the normal route by comparing the first driving route with the second riving route acquired by detecting the color of the vehicle guidance line 50. Specifically, the controller 140 may determine whether the first driving route is identical to the second driving route depending on whether information about the color of the predetermined vehicle guidance line corresponding to the first driving route is identical to the color of the vehicle guidance line 50 in front of the vehicle. Here, the second driving route based on the color of the vehicle guidance line 50 may be stored in the storage unit 150.

Then, the controller 140 determines at step S650 whether the first driving route is identical to the second driving route.

The controller 140 may determine whether the first driving route is identical to the second driving route by determining whether the first driving route and the road information, received from the driving route generation unit 110, matches the color of the vehicle guidance line 50 detected by the guidance line detection unit 130. When it is determined that the first driving route is identical to the second driving route, the controller 140 may control the vehicle so as to keep driving at step S660.

When it is determined that the first driving route is not identical to the second driving route, the controller 140 may control the vehicle so as to drive along a normal route corresponding to the first driving route at step S670. Additionally, when it is determined that the first driving route is not identical to the second driving route, the controller 140 may display a warning message to a driver.

The apparatus and method for driving a vehicle along a normal route according to an embodiment of the present disclosure may determine whether the vehicle is driving along the normal route by detecting a vehicle guidance line.

Also, when a vehicle approaches a fork, whether the vehicle is driving in the correct lane may be determined.

Also, the apparatus and method for driving a vehicle along a normal route according to an embodiment of the present disclosure may assist a navigation system, which may be inaccurate due to the error of a GPS.

Additionally, other characteristics and advantages of the present disclosure may be newly understood through the embodiments of the present disclosure.

As described above, the present disclosure may realize the apparatus and method for driving a vehicle along a normal route, in which whether a lane in which a vehicle is driving is identical to the lane of a driving route of the vehicle is determined by detecting a vehicle guidance line marked on the lane in which the vehicle is driving.

While the embodiments of the present disclosure have been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. An apparatus for driving a vehicle along a normal route, comprising:
    a driving route generating unit generating a first driving route of the vehicle;
    an image generation unit generating a front-side view image of the vehicle;
    a guidance line detection unit detecting a vehicle guidance line marked on a road surface based on the front-side view image, wherein the guidance line detection unit sets a region of interest in front of the vehicle, detects colors within the region of interest, and selects a color occupying a most part of the region of interest, excluding a color of a road, among the colors within the region of interest, as a color of the vehicle guidance line; and
    a controller controlling the vehicle so as to drive along a route determined by comparing the first driving route of the vehicle with a second driving route generated by detecting the vehicle guidance line corresponding to the selected color, wherein the driving route generation unit sends information about a color of a predetermined vehicle guidance line corresponding to the first driving route to the controller, and
    wherein the controller determines whether the first driving route is identical to the second driving route depending on whether a color of the vehicle guidance line, detected by the guidance line detection unit, is identical to the information about the color of the predetermined vehicle guidance line.

2. The apparatus according to claim 1, wherein the controller displays a warning message to a driver of the vehicle when it is determined that the first driving route is not identical to the second driving route as a result a of determination of whether the first driving route is identical to the second driving route.

3. The apparatus according to claim 1, wherein the controller controls the vehicle so as to drive along a route that is identical to the first driving route when it is determined that the first driving route is not identical to the second driving route as a result of a determination of whether the first driving route is identical to the second driving route.

4. The apparatus according to claim 1, wherein the controller controls the vehicle so as to keep driving when it is determined that the first driving route is identical to the second driving route as a result a of determination of whether the first driving route is identical to the second driving route.

5. The apparatus according to claim 1, wherein the second driving route is a route following a vehicle guidance line having a color that is identical to a color of the vehicle guidance line detected by the guidance line detection unit.

6. The apparatus according to claim 1, wherein the guidance line detection unit sets multiple sampling areas for detecting colors within the region of interest and recognizes a color of a majority of the sampling areas, among the colors detected in the sampling areas, as the color of the vehicle guidance line.

7. The apparatus according to claim 1, wherein the guidance line detection unit recognizes lane markings marked on the road surface based on the front-side view image and identifies a lane in which the vehicle is driving based on the lane markings.

8. The apparatus according to claim 7, wherein the guidance line detection unit sets a center of the lane in which the vehicle is driving as a region of interest.

9. A method for controlling a vehicle, comprising:
    generating a first driving route of the vehicle;
    detecting a vehicle guidance line using a front-side view image of the vehicle;
    generating a second driving route based on a result of detecting the vehicle guidance line; and
    controlling the vehicle so as to drive along a route determined by comparing the first driving route with the second driving route, wherein in the controlling of the vehicle, whether the first driving route is identical to the second driving route is determined depending on whether information about a color of a predetermined vehicle guidance line corresponding to the first driving route is identical to a color of the vehicle guidance line in front of the vehicle.

10. The method according to claim 9, wherein in the detecting of the vehicle guidance line, the first driving route of the vehicle is generated, lane markings marked on a road surface are recognized based on the front-side view image acquired by capturing an image of a front of the vehicle, and a lane in which the vehicle is driving is identified based on the lane markings.

11. The method according to claim 9, wherein the detecting of the vehicle guidance line comprises setting a region of interest in front of the vehicle, detecting a color of the region of interest, and selecting a color occupying a most part of the region of interest, excluding a color of road, as a color of the vehicle guidance line.

12. The method according to claim 9, wherein in the controlling of the vehicle, the vehicle is controlled so as to keep driving when it is determined that the second driving route is identical to the first driving route.

13. The method according to claim 9, wherein in the controlling of the vehicle, the vehicle is controlled so as to drive along a normal route that is identical to the first driving route when it is determined that the second driving route based on the color of the vehicle guidance line is not identical to the first driving route.

14. The method according to claim 9, wherein in the controlling of the vehicle, a warning message is displayed to a driver of the vehicle when it is determined that the second driving route based on the color of the vehicle guidance line is not identical to the first driving route.

* * * * *